July 10, 1962 J. M. DAVIN ET AL 3,043,149
FRICTION DRIVE APPARATUS
Filed Jan. 6, 1960 5 Sheets-Sheet 4
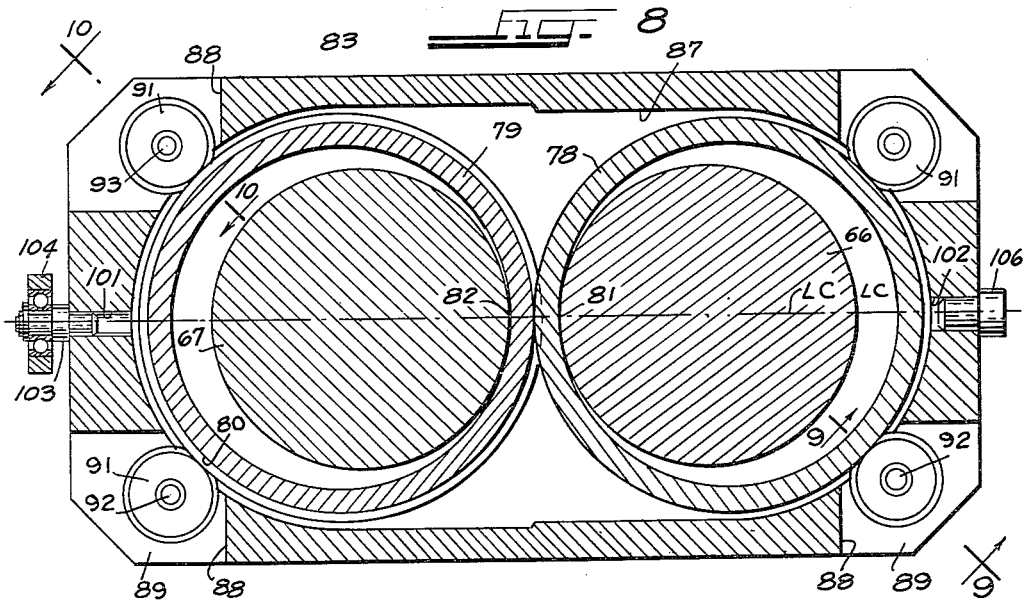
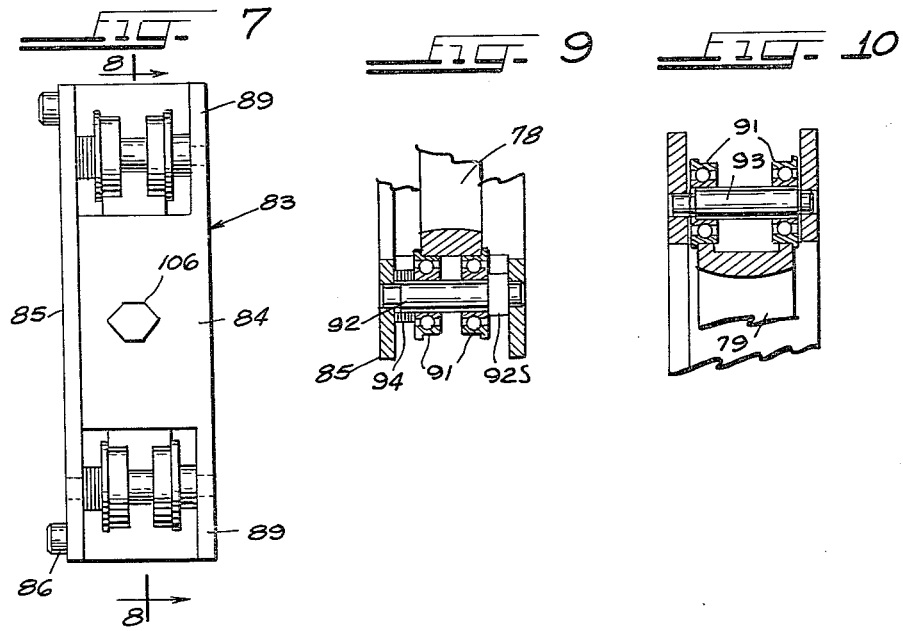
INVENTORS:
JOSEPH M. DAVIN
HANS A. HUG
BY
Wallace and Cannon
ATTYS.

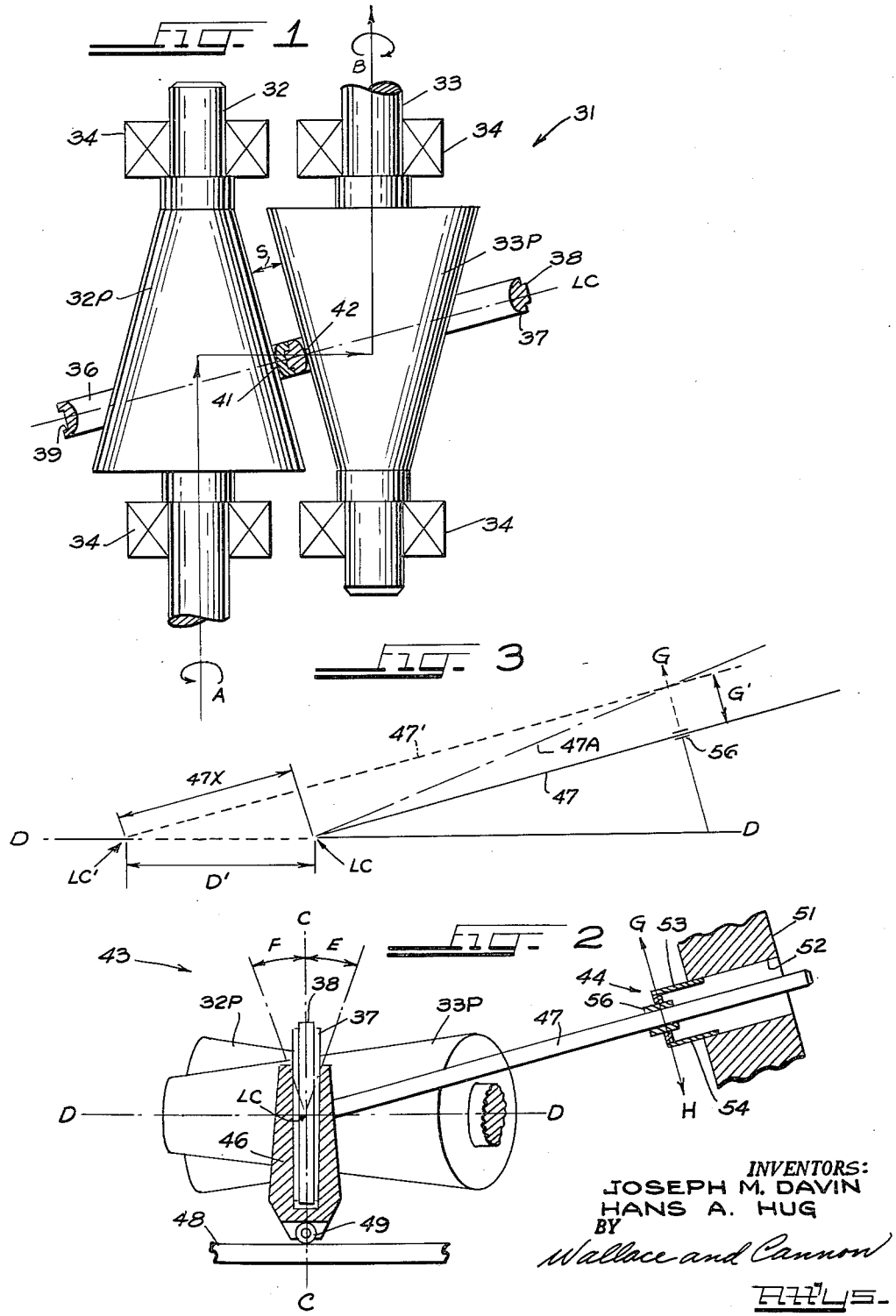

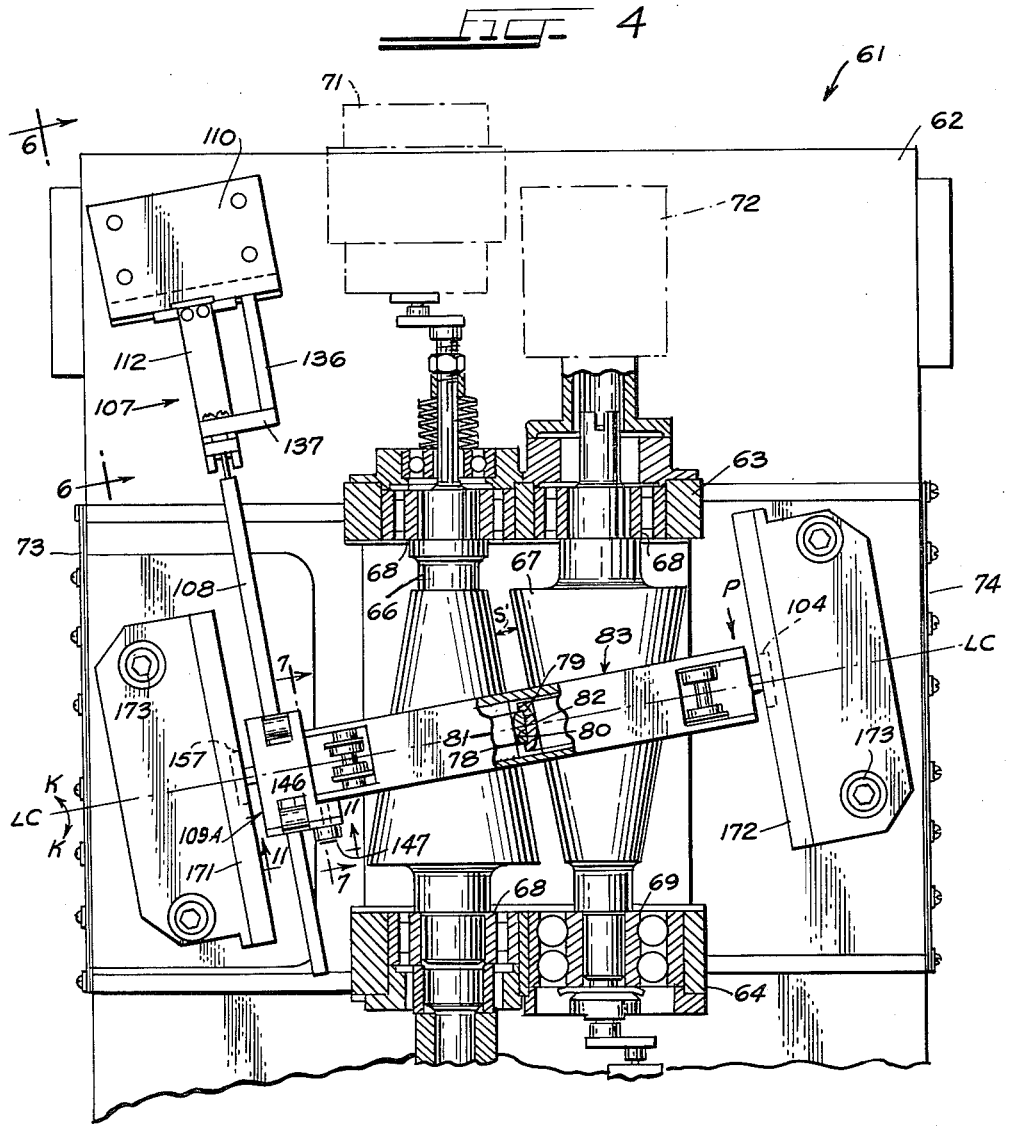

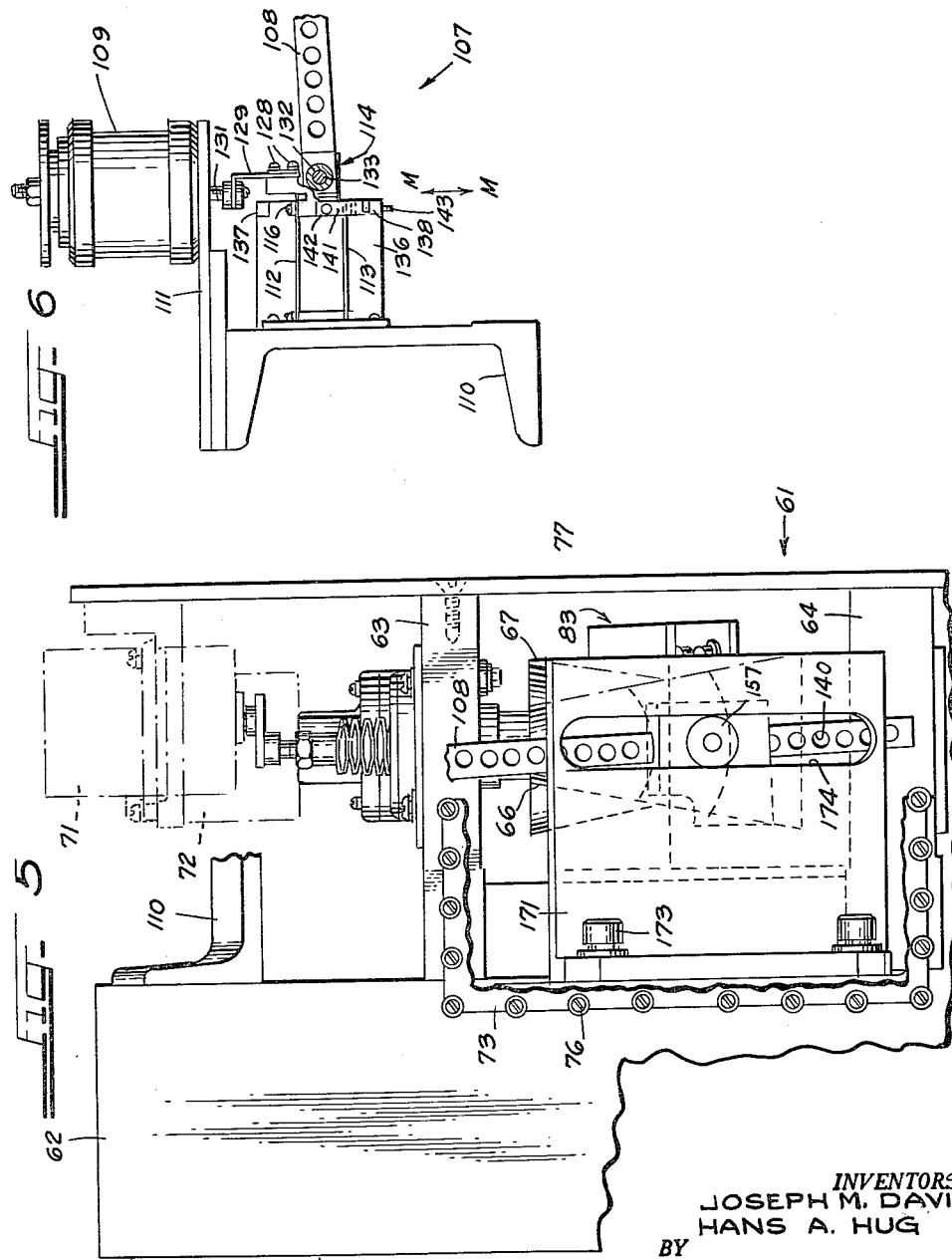

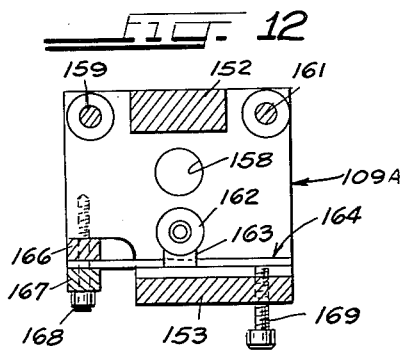
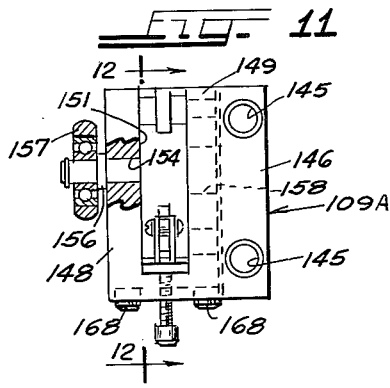
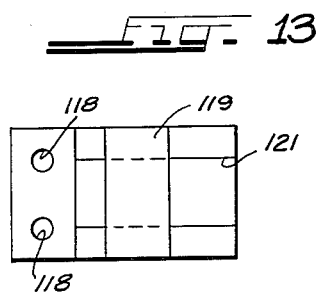
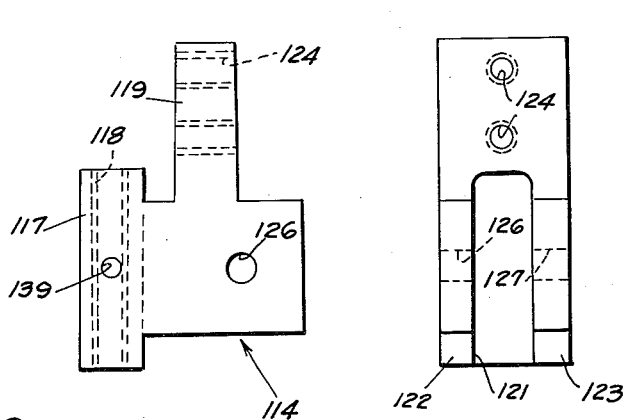
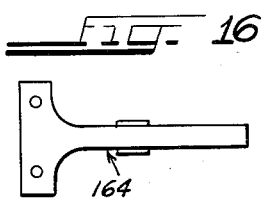
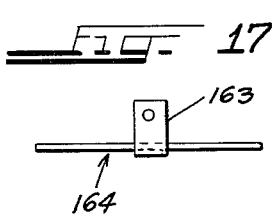
INVENTORS:
JOSEPH M. DAVIN
HANS A. HUG

United States Patent Office 3,043,149
Patented July 10, 1962

3,043,149
FRICTION DRIVE APPARATUS
Joseph M. Davin and Hans A. Hug, Norwood, Mass., assignors, by mesne assignments, to American Brake Shoe Company, New York, N.Y., a corporation of Delaware
Filed Jan. 6, 1960, Ser. No. 841
14 Claims. (Cl. 74—192)

This invention relates to servo-mechanisms of the type in which a variable magnitude input signal effects a corresponding displacement of an output member. This invention also relates to a variable speed drive device and to an arrangement wherein such a servo-mechanism is adapted to regulate the output speed of the variable speed drive device.

Servo-mechanisms of the general type to which this invention relates are well known and widely utilized in the control field wherein the servo-mechanisms quite frequently serve as relays for selectively positioning an output member from a remote location or by means of a comparatively small magnitude input signal. Such servo-mechanisms generally embody apparatus for imposing an input signal, an output member which is movable in response to variations in the input signal, a source of power for multiplying the force of the input signal, and an interconnection between the input signal apparatus and the output member for transmitting signals therebetween. As an example, in the hydraulic arts the foregoing elements may take the form of a pilot valve, a servo motor, and a connecting linkage. In such an arrangement the pilot valve controls the supply of pressurized hydraulic fluid to the servo motor to thereby selectively position the servo motor, and the mechanical linkage, generally a tiltable beam, interconnects the servo motor and pilot valve in a manner such that any movement of the servo motor effects a corresponding movement of the pilot valve. In the foregoing arrangement an input signal is manifested as an initial displacement of the pilot valve, causing movement of the servo motor, and the resultant movement of the servo motor, in effect, transmits a feed-back signal to the pilot valve to rebalance the system at a new position which is dependent upon the magnitude of the input signal. Similarly, in the electrical arts an electric servo motor may be interconnected with input signal apparatus, in the form of an electrical potentiometer or the like, in a servo-mechanism of the general type described.

It is a primary object of this invention to utilize an input signal, an output member, and an interconnecting linkage in a novel servo-mechanism arrangement. The operative association of the elements of a servo-mechanism constructed in accordance with this invention may be visualized as forming an expandible proportional triangle in which there is a predetermined relationship between the interior angles thereof whenever the servo-mechanism is in a balanced condition and in which the amplitude gain, or the ratio of output displacement to input displacement, can be adjusted by a suitable choice of the relationship between the interior angles of the triangle as will presently be described in greater detail.

Thus, in accordance with this invention apparatus affording an input signal is movable in a first direction within a given plane and an output member is movable in a second direction within the same plane. A lever arm of variable length is operatively associated with both the signal input apparatus and the output member and is angularly inclined with respect to the first and second directions of movement of these elements in a manner such that the longitudinal axes of the lever arm and lines extending along said first and second directions form a triangle having a predetermined relationship between the interior angles thereof whenever the servo-mechanism is in a balanced condition. The various elements of the servo-mechanism are interrelated in a manner such that lengthening or shortening of one leg of the triangle, as by variation of the magnitude of the input signal, causes the output member to move in said second direction sufficiently far to restore the proportionality between the two legs of the triangle and the relationship between the interior angles of the triangle existing in the balanced condition of the mechanism.

Related objects are to construct a servo-mechanism in which a small magnitude input signal may control a large output force and in which the output or follower member is accurately positioned in response to variations in the input signal.

The foregoing servo-mechanism as constructed in accordance with this invention can be employed with various sources of power as well as various devices for utilizing such sources of power for positioning an output member. For example, the foregoing servo-mechanism arrangement can be employed with hydraulic, electrical, and mechanical devices in which the output member can serve either to exert a direct thrust, to position additional apparatus, or to serve some other desired function.

As will be apparent hereinafter, the foregoing proportional triangle servo-mechanism of this invention is particularly well adapted for use in conjunction with a variable speed drive device in a manner such that a relatively small magnitude input signal effects accurate control of the variable speed drive device, and to so utilize the servo-mechanism is another object of this invention.

Various types of variable speed drive devices have been heretofore proposed. The majority of such devices rely on friction between different elements for transmitting power through the device. It is a characteristic of most of these devices that large actuating forces are required to change the output speed of the devices. As an example, one type of variable drive speed device used for high power transmission utilizes a tensioned belt between variable diameter pulleys. One of these pulleys is rotated by some suitable mechanism, such as an electric motor, and the belt frictionally drives and rotates the other output pulley. To effect a change in the relative rotational speeds of the two pulleys, and thus in the output speed of the overall device, the effective diameter of one pulley is enlarged while the other is decreased. This mode of operation necessitates sliding the tension belt on the pulleys which, of course, requires a large actuating force to overcome the large friction force between the belt and the pulley. Another problem involved with the variable speed drive devices heretofore known has been that of obtaining a variable output speed which is uniform for any given input signal and which may be continuously varied over a wide range of output speeds. It is therefore another object of this invention to so construct a variable speed drive device as to enable a variable output speed to be accurately obtained throughout a wide range of speeds and by a comparatively small magnitude input signal.

In accordance with this invention a pair of conical-shaped shafts are formed with complementary tapered surfaces and arranged side by side with the conical surfaces thereof oppositely disposed. A pair of rings, hereinafter referred to as rollrings, encircle the shafts and are aligned by suitable structure with one another in a manner such that the portions of the rollrings disposed between the shafts are engaged at their inner peripheries with the shafts and are engaged at their outer peripheries with one another. In this manner rotation of one shaft causes rotation of the opposite shaft through the frictional engagement of the portions of the rollrings interposed therebetween. The relative speeds of rotation of the two shafts are dependent upon the axial position of the rollrings along the shafts which determines the relative diameters of the two shafts. The rollrings are tiltable about an axis passing through the centers of the rollrings and the areas of engagement with the shafts so that the rotation of the shafts is effective to drive the rollrings frictionally in either direction along the longitudinal axis of the shafts to effect a corresponding change in the relative rotational speeds of the two shafts. Normally, the rollrings are disposed in a position wherein the engaged portions of the rollrings traverse a circular path on the periphery of the shafts so that there is no relative movement in the direction of the longitudinal axis between the rollrings and the shafts. However, upon tilting the rollrings from this position and about the axis passing through the centers of the rollrings, the engaged portions of the rollrings traverse helical paths on the peripheries of the shafts and thereby cause the rollrings to move longitudinally along the shafts in a direction which is dependent upon the angle at which the rollrings are tilted. Such tilting of the rollrings to change the relative rotational speeds of two shafts can be compared to turning the front wheels of a car. The wheels, or the rollrings, are easy to turn when the car, or the shafts, is in motion, but not when it is stationary. The force required to tilt the rollrings is quite small so that the variable speed drive device is well suited for manually controlled operation as well as other variable speed applications where only low level control forces are available, such as remote and feed-back control applications. It is another object of this invention to incorporate a conical shaft and rollring combination as described hereinabove in a novel variable speed drive device.

In a variable speed drive device constructed in accordance with this invention the structure maintaining the above described alignment of the rollrings may constitute an output member of a proportional triangle servo-mechanism arrangement also as described hereinabove. In such a case the aforesaid lever arm may be operatively associated with such alignment structure in a manner so that variation of the angular inclination of the lever arm is effective to tilt the rollrings, and so to do is yet another object of this invention.

Additional objects of this invention are to include guide mechanism in a variable speed drive device as described for insuring that the output member travels in a straight line motion and to afford a limited degree of movement between the rollrings and the structure aligning the rollrings so that such movement of the rollrings as may be caused by minor variations in part dimensions, imperfect mating of the shafts, vibrations or other reasons do not adversely affect operation of a proportional triangle servo-mechanism associated therewith.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a plan view showing the operative elements of one embodiment of a variable speed drive device constructed in accordance with this invention;

FIG. 2 is a side elevation view showing one embodiment of a control arrangement which can be utilized with the variable speed drive device shown in FIG. 1 for selecting a variable output speed;

FIG. 3 is a diagrammatic view illustrating the operative association of the elements of an embodiment of a servo-mechanism constructed in accordance with this invention;

FIG. 4 is a plan view of another embodiment of a combined variable speed drive device and servo-mechanism control arrangement constructed in accordance with this invention;

FIG. 5 is a side elevation view, partly broken away, of the embodiment of the invention illustrated in FIG. 4;

FIG. 6 is a fragmentary side elevation view taken approximately in the direction of the arrows 6—6 in FIG. 4 of a signal input apparatus as utilized in the embodiment of the invention illustrated in FIG. 4;

FIG. 7 is an enlarged elevation view of a rollring deck assembly and taken generally in the direction of the arrows 7—7 in FIG. 4;

FIG. 8 is an elevation view taken approximately in the direction of the arrows 8—8 in FIG. 7;

FIG. 9 is a detailed view taken generally in the direction of the arrows 9—9 in FIG. 8;

FIG. 10 is a detailed view taken approximately in the direction of the arrows 10—10 in FIG. 8;

FIG. 11 is a detail elevation view of a lever-housing assembly utilized in the embodiment of the invention illustrated in FIG. 4 and taken generally in the direction of the arrows 11—11 in FIG. 4;

FIG. 12 is an elevation view taken approximately in the direction of the arrows 12—12 in FIG. 11;

FIG. 13 is an enlarged plan view of a bracket utilized in the signal input apparatus illustrated in FIG. 6;

FIG. 14 is a side elevation view of the bracket illustrated in plan in FIG. 13;

FIG. 15 is an end elevation view of the bracket shown in plan in FIG. 13;

FIG. 16 is an enlarged bottom plane view of a spring piece utilized in the lever-housing assembly illustrated in FIGS. 11 and 12;

FIG. 17 is a side elevation view of the spring piece illustrated in plan in FIG. 16; and FIG. 18 is an end elevation view of the spring piece illustrated in plan in FIG. 16.

In FIG. 1 an embodiment of a variable speed drive device constructed in accordance with this invention is designated generally by the reference numeral 31, and includes a pair of parallel shafts 32 and 33 which are rotatably mounted within suitable bearings as 34. The shafts 32 and 33 are formed with conical-shaped peripheral surfaces 32P and 33P, respectively, in the central portions thereof. The conical surfaces are complementary to each other so that the adjacent portions of the conical surfaces define a space S of uniform width in the plane of the longitudinal axes of the shafts.

A rollring 36 is disposed in encircling relation with the conical periphery 32P of the shaft 32. In like manner a rollring 37 is disposed in encircling relation with the conical periphery 33P of the shaft 33. The rollring 37 is formed with a flange 38 round its outer periphery while the rollring 36 is formed with a complementary recess 39 so that the two rollrings may be arranged in interlocking relation in the portions of the rollrings intermediate the shafts 32 and 33. The combined width of the rollrings is related to the space S in a manner such that the inner peripheries of the rollrings are frictionally engaged with the shafts 32 and 33 at areas indicated by the respective reference numerals 41 and 42 in FIG. 1. These areas of contact are essentially of a linear configuration by reason of the relationship of the relative diameters of the rollrings and the shafts and the convex curve of the inner peripheries of the rollrings. That is, there is some resilience to the rollrings so that there is an arcuate portion of each roll ring engaged with a shaft rather than just a point contact therebetween. Thus, upon a force being applied to rotate the shaft 32 in the direction of the arrow A in FIG. 1, the shaft 33 is caused to rotate in the opposite direction as indicated by the arrow B, by reason of the frictional drive afforded by the portion of the rollrings 36 and 37 interposed in the space S between the shafts. The rollrings 36 and 37 also rotate with the respective shafts and thus rotate in opposite directions with respect to one another.

The relative speeds of rotation of the two shafts are dependent on the relative lengths of the radii at the points of engagement with the rollrings and thus are dependent upon the positions of the rollrings along the longitudinal axes of the two shafts. Therefore, if the shaft 32 is driven at a constant rotational speed, the speed of rotation of the shaft 33 may be varied from a maximum to a minimum by moving the rollrings 36 and 37 from the largest diameter portion of the conical surface 32P to the smallest diameter portion, or from bottom to top as viewed in FIG. 1.

The rollrings 36 and 37 may be moved as a unit along the longitudinal axes of the shafts 32 and 33 in either an upper or lower direction as viewed in FIG. 1 to effect a desired output speed of the shaft 33 in either an upper or lower direction as viewed in FIG. 1 to effect a desired output speed of the shaft 33 in a manner now described. The rollrings 36 and 37 are tiltable about an axis LC which passes through the centers of the rollrings and through the areas of engagement 41 and 42 with the shafts 32 and 33. Normally, the rollrings are disposed so that a line CC, as viewed in FIG. 2, passing vertically through the medial portion of each rollring is perpendicularly disposed to a plane DD defined by the longitudinal axes of the shafts 32 and 33. In this position the areas of contact 41 and 42 each traverse a circular path about the conical surfaces 32P and 33P and there is no movement of the rollrings along the longitudinal axes of the shafts. However, should the rollrings be tilted about the axis LC from this balanced condition in the direction of the arrows E or F in FIG. 2, the areas of contact 41 and 42 must traverse helical paths along the surfaces 32P and 33P, whereby the frictional engagement between the rollrings and shafts cause the rollrings to move in a longitudinal direction with respect to the shafts. The direction of such movement and rate of progression of the rollrings are dependent upon the direction and extent of tilt of the rollrings. The rollrings continue to move longitudinally on the shafts until returned to the balanced position as illustrated in FIG. 2.

As mentioned hereinabove, the force required to effect such tilting action of the rollrings is relatively small so long as the shafts 32 and 33 are being rotated. This is true even though the rollrings may be pressed into quite tight engagement with the shafts to thereby insure that large torques can be transmitted between the shafts. The variable speed drive device 31 thus enables a continuously variable output speed to be obtained in a device which is suitable for large power applications but requires a comparatively small control force for effecting a variation in the output speed.

In accordance with this invention the rings 36 and 37 are tilted by a servo-mechanism which applies an input signal of a predetermined magnitude to cause the rings to move toward a new position corresponding to a desired output speed. The servo-mechanism also sums up the movement of the rollrings in a manner such that the rollrings are returned to a balanced position at the exact location along the shafts corresponding to the new output speed as selected by the input signal.

One embodiment of a serevo-mechanism which functions in this manner is illustrated in FIG. 2 and is designated generally by the reference numeral 43. The servo-mechanism 43 includes three operative elements—a signal input apparatus 44, an output or follower member 46, and an interconnecting linkage in the form of a lever arm 47. As applied to the variable speed drive device 31, illustrated in FIG. 1, the output member 46 is in the form of a yoke which engages the opposite faces of each of the rollrings 36 and 37 and affords the means both for maintaining the rollrings in the alignment as illustrated in FIG. 1 and for effecting a tilting action of the rollrings in either direction of the arrows E or F in FIG. 2. Such tilting of the rollrings 36 and 37 causes the rollrings to move longitudinally of the shafts in a manner such that the axis of tilt LC moves along the line DD as viewed in FIG. 2. The lever arm 47 in the embodiment illustrated in FIG. 2 is rigidly connected to the yoke 46, so that movement of the portion of the lever arm that is associated with the signal input apparatus 44 in the direction of the arrows G or H causes the yoke to tilt about the axis LC, which projects as a point in FIG. 2.

It is important from the standpoint of maintaining accurate response of the servo-mechanism 43 to an input signal that the yoke or output member 46 and the pivotal axis LC move in a straight line along the path DD, as will be apparent from the further description. For the purpose of assuring such straight line movement of the yoke 46 a yoke guide 48 is provided and a roller 49, mounted at the lower end of the yoke, supports the yoke from the yoke guide 48.

It should be noted that the rollrings are permitted movement within the yoke in a direction transverse to the surface of the yoke guide 48 so that vertical oscillations of the rollrings due to imperfect mating of the shafts, dust, or other factors do not adversely affect operation of the servo-mechanism.

The input signal apparatus 44 comprises a fixed support 51 which is formed with a bore or recess 52 for receiving the free end of the lever arm. A pair of flexure members 53 and 54 are mounted at one end within the recess 52 and support an arm guide 56 at their opposite ends. The lever arm 47 is slidably mounted within the arm guide 56 but is movable in the direction of the arrows G or H by an input signal applied to the apparatus 44.

The manner in which the various elements of the servo-mechanism 43 are interrelated one with another may be visualized as an expandible proportional triangle, and the operation of the servo-mechanism will be described with particular reference to FIG. 3, which graphically illustrates this relationship. The input signal apparatus 44 is movable in a first linear direction which is entirely contained within a given plane. The output or yoke member 46 is also movable in a second linear direction which is entirely contained within the same plane. The longitudinal axis of the lever arm 47 is also disposed within this plane and defines a triangle with lines extended along the first and second directions of movement of the respective input apparatus and output member. Thus, and as viewed in FIG. 3, the axis of the lever arm 47 defines a triangle, as shown in solid outline, with the lines G and D corresponding to the directions of movement of the input apparatus 44 and the output yoke 46. Whenever the relationship of the interior angles of this triangle is as shown in the bold outline, the rollrings are disposed at the untilted or balanced position as illustrated in FIG. 2. However, should an input signal be applied to the servo-mechanism 43 causing one leg of the triangle to be extended by the amount G', this relationship of the interior angles is disturbed and the lever arm 47 is angularly inclined to the position shown by the phantom line 47A wherein the rollrings are tilted in the direction of the arrows F in FIG. 2. This causes the rollrings and the output member 46 to move axially along the shafts a distance D', as indicated in FIG. 3, to a new position wherein the lever arm 47 is restored to its original inclination in the position 47' as indicated in FIG. 3. Thus, a new triangle is defined which is proportional to the original triangle as shown in the bold outline. In this instance the effective length of the lever arm is increased by the amount 47X. An input signal in the direction of the arrow H causes a repositioning of the elements in a smaller proportional triangle. It will be recognized that the amplitude gain, or the ratio of output displacement to the input displacement can be adjusted by a suitable choice of the relationship of the interior angles of the triangle in the equilibrium condition of the system. To enable this relationship of the sides and angles of the triangle to be restored, the portion of the lever arm 47 intermediate the points associated with the yoke 46 and the arm guide 56 must be of a variable length, and in the embodiment illustrated in FIG. 2 this is realized by the sliding fit of the lever arm 47 within the arm guide 56.

Alternately, the lever arm could be pivotally attached to the support 51 and the arm guide fixed to the yoke. In such a case the lever arm would be allowed movement with respect to the yoke. Other variations are possible, but the important feature of the servo-mechanism 43 is the manner in which the various elements coact to form a proportional triangle at each balanced condition of the servo-mechanism to obtain linearity of response of the output displacement to the input signal.

Another embodiment of this invention is illustrated in FIGS. 4–6 and is designated generally by the reference numeral 61. The servo-mechanism controlled, variable speed drive mechanism 61, as illustrated in these figures, includes a rigid base 62 which is formed with a pair of upstanding ribs 63 and 64. A pair of conical shafts 66 and 67, whose conical surfaces are complementary shaped and oppositely disposed, are rotatably mounted at opposite ends within the ribs 63 and 64 by bearings 68 and 69. The shafts 66 and 67 may preferably be formed with shoulder flanges as illustrated for engaging the lateral faces of the bearings and thereby accurately retaining the shafts in accurate alignment with the base 62. The shaft 66 is driven at one end by any suitable means, such as an electric motor, and a tachometer generator 71, as indicated by the phantom outline in FIG. 4, may be installed on an opposite end thereof for test or maintenance purposes. A pump 72, or similar power absorption device is mounted on an adjacent end of the shaft 67. A tachometer generator or other similar speed measuring device may be attached to the opposite end of the shaft 67 if desired.

Side plates 73 and 74 are preferably mounted on the base 62 and ribs 63 and 64 as by a plurality of cap screws 76, while a top cover plate 77 may be mounted on the upper ends of the ribs 63 and 64. The configuration and disposition of the conical surfaces of the shafts are the same as that of the shafts 32 and 33 as illustrated in FIG. 1. Thus, the adjacent peripheries of the shafts 66 and 67 define a space S' of uniform width in the plane of the longitudinal axes of the shafts.

Also, as in the embodiment illustrated in FIG. 1, each of the shafts 66 and 67 is encircled by respective rollrings 78 and 79, and the portions of these rollrings intermediate the shafts 66 and 67 are engaged on their inner peripheries at areas 81 and 82 with their respective shafts 66 and 67 and are engaged at their outer peripheries with each other. Thus, the rollrings afford a frictional drive connection between the input shaft 66 and the output shaft 67. Preferably, and as illustrated in FIG. 4, the outer periphery of the rollring 79 is formed with an annular recess 80 for receiving the rollring 78 in interlocking relation therewith. The rollrings 78 and 79 are movable in either direction along the longitudinal axes of the shafts 66 and 67 for the purpose of effecting a change in the relative rotational speeds of the two shafts, but are mounted within a deck assembly member 83 rather than being contained within a yoke as illustrated in FIG. 2.

The manner in which the rollrings 81 and 82 are mounted within the deck assembly 83 is shown in detail in FIGS. 7–10. In these figures it is seen that the deck assembly 83 includes a deck body 84 and a cover plate 85 mounted thereon by a plurality of cap screws 86. The interior of the deck body 84 is formed to have a somewhat loop-shaped central opening 87 which is slightly larger than the exterior diameter of the rollrings 78 and 79. Recesses 88 are formed in each corner of the deck body and communicate with the opening 87. The recesses 88 do not extend for the full width of the deck body so that flanges 89 extend across the base of the recesses.

With reference now to FIGS. 9 and 10, it is seen that a series of flanged bearings 91 are positioned within the recesses 88 by shafts 92 and 93, which are in turn mounted within corresponding openings formed in the flanges 89 and the corners of the cover plate 85. The flanged bearings 91 engage the outer peripheries of the rollrings 78 and 79 so as to rotatably support the rollrings within the deck body and additionally engage the opposite faces of each rollring to maintain an axial alignment of the rollrings within the deck body. Inasmuch as the rollring 78 is of smaller width than the rollring 79, each of the shafts 92 is preferably formed with a shoulder 92S for engaging one face of the bearing to thereby retain the bearing 91 in position within the deck body while a plurality of shims 94 maintain the desired spacing between the other face flanged bearing 91 and the cover plate 85.

The deck body 84 is formed with cylindrical openings 101 and 102 at each end which are centered about the axis LC passing through the centers of the rollrings 78 and 79. The opening 101 receives a bearing pin 103 therein, which bearing pin is formed with a shoulder at the central portion thereof so as to facilitate mounting of a ball bearing 104 on the free end thereof. A hexagonal head location pin 106 is mounted within the opening 102 for a purpose presently to be described.

With reference now to FIG. 4, the rollrings 78 and 79 and the deck assembly 83 are adapted to be tilted as a unit about the axis LC in the direction of the arrows KK to effect a repositioning of the rollrings along the longitudinal axis of the shafts 66 and 67 to thereby vary the output speed of the shaft 67. For the purpose of effecting such tilting of the deck assembly 83, means for applying an input signal, designated generally by the reference numeral 107, are connected to the deck assembly 83 through a lever arm 108 and a lever arm housing assembly 109.

The means for applying an input signal are best shown in FIG. 6 and are supported from the base 62 by a mounting channel 110. These means include an actuator, shown as an electrical voice coil actuator 109 which is mounted by an adapter plate 111 to the top flange of the channel 110. Other electrical apparatus, such as torque motors, could also be utilized. Furthermore, while electrical apparatus is illustrated, the actuator for producing the input signal can as well be manually, hydraulically, pneumatically, or mechanically actuated. For clarity of illustration this portion of the input signal means have not been shown in FIGS. 4 or 5. The means 107 for applying an input signal also comprise a pair of flexure strips 112 and 113, each of which is mounted at one end to the web of the channel 110 so as to project outwardly therefrom. A bracket 114, shown in detail in FIGS. 13–16, is connected between the free ends of the flexure strips 112 and 113 by a pair of bolts 116.

With particular reference to FIGS. 13–15 it is seen that the bracket 114 includes a vertically extending bar portion 117 which is formed with holes 118 extending between the flat upper and lower surfaces thereof, and which holes are adapted to receive the shanks of the bolts 116. The bracket 114 also includes an upwardly projecting flange 119 which bridges across a recess 121 defined between the pair of depending lugs 122 and 123. Tapped openings 124 are formed in the flange 119 and aligned openings 126 and 127 are formed in the lugs 122 and 123. The tapped openings 124 are adapted to receive cap screws 128, seen FIG. 6, for mounting an L piece 129 interconnecting the plunger 131 of the solenoid 109 with the bracket 114.

The lever arm 108 has a bearing 132 mounted within an opening formed in one end of the lever arm, and a pin 133 extends through the bearing 132 and is mounted within the openings 126 and 127 formed in the flanges 122 and 123 of the bracket 114. Thus, the lever arm 108 is pivotally mounted within the recess 121 of the bracket 114 in a manner such that movement of the plunger 131 in the direction of the arrows MM in FIG. 6 is effective to raise or lower the end of the lever 108, and thereby vary the angular inclination of the rollring deck assembly 83 in a manner presently to be described. The flexure strips 112 and 113 minimize the friction forces encountered in such movement of the lever arm and also afford a biasing force for returning the system to an at-rest disposition upon the cessation of an input signal from the actuator 109.

In this particular embodiment of the invention stop means are provided for limiting the maximum displacement of the lever arm 108, and these stop means include a plate 136 which is formed with legs 137 and 138 extending above and below the flexure strips 112 and 113. Referring again to FIG. 14, it is seen that the bar 117 is provided with a tapped opening 139 which extends transversely to the openings 118. A stop piece 141 is mounted to the bracket 114 by a cap screw 142 threaded within the tapped opening 139, and an adjustable stud 143 is positionable within the lower projecting leg 138 of the stop plate so as to engage the lower edge of the stop piece 141 upon a predetermined downward movement of the bracket 114.

The lever arm 108 may preferably be formed with a series of openings 140 which serve to lighten the lever arm without affecting the rigidity thereof. The end portion of the lever arm 108 opposite that connected to the bracket 114 is operatively associated with a lever housing assembly 109A so that movement of the end of the lever 108 by the aforesaid action of the actuator 109 causes a corresponding tilting of the deck assembly 83. As viewed in FIG. 4, it is seen that the lever housing assembly 109A is formed with a flanged portion 146 and this flanged portion enables the housing assembly to be rigidly secured to an end of the deck assembly 83 by cap screws 147 which are threaded within openings formed in the deck body 84.

Referring now to FIGS. 11 and 12, the construction of the lever housing assembly 109A is shown in detail. In FIGS. 11 and 12 it is seen that the lever housing assembly 109A includes outer and inner walls 148 and 149 which are spaced apart so as to define an opening 151 therebetween which is adapted to receive the lever arm 108. The inner and outer walls are integrally joined together by bridge pieces 152 and 153 which extend between the upper and lower portions of these walls. The outer wall 148 includes an opening 154 which mounts a bearing pin 156 therein. The bearing pin 156 is formed with a shoulder in central portion thereof so as to maintain a ball bearing assembly 157, retained on the free end of the pin, in spaced relation with the outer surface of the wall 148. The inner wall 149 is provided with a circular opening 158 which is adapted to receive the head of the location pin 106 and thereby accurately align the lever housing assembly with the axis LC passing through the centers of the rollrings 78 and 79. A pair of shafts 159 and 161 are mounted at opposite ends within the walls 148 and 149 and include enlarged collars at the central portions thereof which are adapted to engage the upper edge of the lever arm 108. A roller 162 is mounted within the lower portion of the opening 151 for engaging the lower edge of the lever arm 108. This roller 162 is centrally disposed between the shafts 159 and 161 so that the collars of the shafts and the roller effectively clamp the lever arm therebetween in a manner such that a variation in the angular inclination of the lever arm by the signal input means causes a corresponding tilting of the lever housing assembly 109A and the rollring deck assembly 83.

As in the embodiment illustrated in FIG. 2, it is important that minor variations in part dimensions, mismating of the shafts, dust, or other factors do not adversely affect operation of the control mechanism. For the purpose of preventing such factors from feeding a false signal from the deck assembly to the lever arm, the lower roller 162 is resiliently mounted within the lever housing assembly for damping out the effect of such factors. Thus, the roller 162 is mounted between a pair of upstanding lugs 163 formed on a spring 164 as illustrated in detail in FIGS. 16–18. As viewed in these figures and FIGS. 11 and 12, it is seen that the spring piece 164 is of a general T-shaped configuration and the bar of the T is interposed between a pair of pads 166 and 167 and attached to the under surfaces of the walls 148 and 149 by cap screws 168. A screw 169 is threaded within the bridge piece 153 so as to engage the base portion of the T-shaped piece adjacent an end thereof and thereby enable the biasing force of the spring piece to be readily adjusted.

To assure proper operation of the servo-mechanism portion of the variable speed device 61, guide means are provided for maintaining straight-line movement of the deck assembly, which in this instance constitutes the output member of the servo-mechanism. These guide means include a pair of brackets 171 and 172 which are rigidly attached to the base 62 by cap screws 173 as viewed in FIGS. 4 and 5. The upstanding portion of each bracket is formed with a slot 174 which is adapted to receive the respective ball-bearing assemblies 157 and 104. Thus, as viewed in FIG. 5, the slot 174 in the bracket 171 affords a guide for the ball bearing 157 to assure that the corresponding end of the deck assembly moves in a straight horizontal line free from any vertical oscillations.

The operation of the embodiment of the invention illustrated in FIGS. 4 and 5 is basically the same as the arrangements illustrated in FIGS. 1–3, and thereby will be only briefly reviewed. Assuming that the input shaft 66 is being rotated at a constant speed by some suitable source of power, such as an electric motor, and assuming also that the rollring deck assembly 83 is in the balanced position as illustrated in the FIGS. 4 and 5, the output shaft 67 and the pump 72 are rotated at a constant speed which is dependent upon the relationship between the respective diameters of the shafts 66 and 67 at the areas of contact 81 and 82. If it should be desired to increase the speed of the output shaft 67, the deck assembly 83 would have to be moved in the direction of the arrow P in FIG. 4. To accomplish such movement of the deck assembly the input signal actuator 109 is energized to vertically displace the end of the lever arm 108 in a direction dependent upon the direction of rotation of the shaft 66. Assuming that the shaft 66 is rotating counterclockwise, as viewed from the larger diameter of the conical portion of the shaft, the plunger 131 is moved downwardly as viewed in FIG. 6. This downward movement of the lever arm 108 and resultant tilting of the rollring deck assembly 83 causes the rollrings to be frictionally driven in the direction of the arrow P in FIG. 4, thereby causing the deck housing assembly to move along the lever arm 108 away from the signal input means 107. As a result of such movement of the lever housing assembly 109A, the lever arm 108 and the deck assembly 83 are gradually restored to their original balanced positions. Thus, the amount of the axial movement of the rollrings with respect to the longitudinal axis of the shafts is dependent upon the magnitude of the input signal developed by the actuator 109. As in the device 31 illustrated in FIGS. 1–3, the servo-mechanism included in the mechanism 61 of FIGS. 4–6 functions in a proportional triangle relationship.

While the proportional triangle servo-mechanism of this invention has been illustrated and described as combined with a mechanically operative variable speed friction drive device, it is apparent that the servo-mechanism is not limited to such applications but can equally well be utilized with hydraulic or electrical systems to selectively position an output member in response to a variable magnitude input signal.

In summary, in accordance with this invention there is afforded a variable speed device which enables a continuously variable output speed to be accurately obtained with a comparatively low input signal force. Also, a variable speed drive device of this invention is capable of transmitting a large torque therethrough and thus is suitable for use in applications where large power is required. Additionally, there is afforded by this invention a servo-mechanism whose operative elements are interrelated one with the other in a manner such as to define proportional triangles at different balanced conditions of operation of the servo-mechanism, and such a servo-mechanism and the variable speed device arrangement can be advantageously combined for operation with one another.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A variable speed drive mechanism comprising, a pair of spaced apart parallel shafts formed with oppositely and complementary tapered conical peripheral surfaces, a pair of rollrings encircling said shafts, said rollrings having portions intermediate said shafts engaged with the adjacent portions of the tapered surfaces of the shafts and with one another whereby rotation of one shaft is effective to cause rotation of the other shaft and the relative speeds of rotation of the two shafts are dependent upon the position of the rollrings along the longitudinal axes of said shafts, means for tilting said rollrings about an axis passing through the centers of the rollrings and the areas of engagement of the rollrings and shafts for moving the rollrings along the longitudinal axes of the shafts and thereby changing the relative speeds of rotation of said shafts, means responsive to the position of the rollrings longitudinally of the shafts for controlling the position of the rollrings.

2. A friction drive comprising; first and second spaced-apart and rotatable drive members having facing surfaces disposed parallel to one another; a first rollring, encompassing said first drive member and disposed in tangential frictional driving engagement with said first drive member; a second rollring, encompassing said second drive member and disposed in tangential frictional driving engagement with said second drive member, said rollrings being tangentially frictionally engaged with each other to transmit torque between said drive members; means for simultaneously tilting said rollrings about an axis passing through the centers thereof to move said rollrings axially of said drive members; and control means for both imparting a tilting force to the rollrings and sensing the amount of tilt of said rollrings while regulating the position of the rollrings axially of the rotatable drive members.

3. A friction drive as defined in claim 2 wherein the means for tilting said rollrings comprise a yoke which engages opposite faces of each rollring so that tilting of said yoke causes each rollring to be tilted an equal amount.

4. A friction drive as defined in claim 2 wherein the means for tilting said rollings comprise a deck member which mounts the rollrings for rotation therein, and wherein said control means include a lever member associated with the deck member and tiltable therewith.

5. A variable speed drive mechanism comprising, a pair of spaced apart shafts, at least one of said shafts having a conical peripheral surface, the adjacent facing surfaces of said shafts being disposed parallel to one another, a pair of rollrings encircling said shafts, said rollrings being aligned with one another in a manner such that the portions of the rollrings disposed in the space between the shafts are engaged at their inner peripheries with the adjacent portions of the surfaces of the shafts and are engaged at their outer peripheries with one another, whereby rotation of one shaft is effective to cause rotation of the other shaft through the rollrings interposed therebetween and the relative speeds of rotation of the two shafts are dependent upon the position of the rollrings along the longitudinal axes of said shafts, input means for applying an input signal to tilt said rollrings about an axis passing through the centers of the rollrings and areas of engagement of the rollrings and shafts from a balanced position wherein the rollrings rotate at fixed axial positions on the shafts to a position wherein rotation of the shafts frictionally drives the rollrings axially along the shafts to thereby change the relative speeds of rotation of the shafts, and means, including a lever member tiltable with the rollrings, for summing up the axial movement of the rollrings and tilting the rollrings back toward the balanced position an angular amount which is dependent upon the axial movement of the rollrings.

6. A variable speed drive mechanism comprising, a pair of spaced apart shafts, at least one of said shafts having a conical peripheral surface, the adjacent facing surfaces of said shafts being disposed parallel to one another, a pair of rollrings encircling said shafts, a deck mounting said rollrings in alignment with one another in a manner such that the portions of the rollrings disposed in the space between the shafts are engaged at their inner peripheries with the adjacent portions of the surfaces of the shafts and are engaged at their outer peripheries with one another, whereby rotation of one shaft is effective to cause rotation of the other shaft through the rollrings interposed therebetween and the relative speeds of rotation of the two shafts are dependent upon the position of the rollrings along the longitudinal axes of said shafts, input means for applying an input signal to tilt said rollrings about an axis passing through the centers of the rollrings from a balanced position wherein the rollrings rotate at fixed axial positions on the shafts to a position wherein rotation of the shafts frictionally drives the rollrings axially along the shafts to thereby change the relative speeds of rotation of the shafts, and means including a lever arm of variable length operatively associated with the input means and said deck for both transferring an input signal from the input means to the deck and subsequently summing up the axial movement of the rollrings and tilting the rollrings back toward the balanced position an angular amount which is dependent upon the axial movement of the rollrings.

7. A variable speed drive mechanism comprising, a pair of spaced apart shafts, at least one of said shafts having a conical peripheral surface, the adjacent facing surfaces of said shafts being disposed parallel to one another, a pair of rollrings encircling said shafts, a yoke mounting said rollrings in alignment with one another in a manner such that the portions of the rollrings disposed in the space between the shafts are engaged at their inner peripheries with the adjacent portions of the surfaces of the shafts and are engaged at their outer peripheries with one another, whereby rotation of one shaft is effective to cause rotation of the other shaft through the rollrings interposed therebetween and the relative speeds of rotation of the two shafts are dependent upon the position of the rollrings along the longitudinal axes of said shafts, input means for applying an input signal to tilt said rollrings about an axis passing through the centers of the rollrings from a balanced position wherein the rollrings rotate at fixed axial positions on the shafts to a position wherein rotation of the shafts frictionally drives the rollrings axially along the shafts to thereby change the relative speeds of rotation of the shafts, and means including a lever arm of variable length rigidly connected to said yoke and slidably associated with said input means for both transferring an input signal from the input means to the yoke and subsequently summing up the axial movement of the rollrings and tilting the rollrings back toward the balanced position an angular amount which is dependent upon the axial movement of the rollrings.

8. A variable speed drive mechanism comprising, a pair of spaced apart shafts, at least one of said shafts having a conical peripheral surface, the adjacent facing surfaces of said shafts being disposed parallel to one another, a pair of rollrings encircling said shafts, said rollrings being aligned with one another in a manner such that the portions of the rollrings disposed in the space between the shafts are engaged at their inner peripheries with the adjacent portions of the surfaces of the shafts and are engaged at their outer peripheries with one another, whereby rotation of one shaft is effective to cause rotation of the other shaft through the rollrings interposed therebetween and the relative speeds of rotation of the two shafts are dependent upon the position of the rollrings along the longitudinal axes of said shafts, input means for applying an input signal to tilt said rollrings about an axis passing through the centers of the rollrings and areas of engagement of the rollrings and shafts from a balanced position wherein the rollrings rotate at fixed axial positions on the shafts to a position wherein rotation of the shafts frictionally drives the rollrings axially along the shafts to thereby change the relative speeds of rotation of the shafts, and output means for summing up the axial movement of the rollrings and tilting the rollrings back toward the balanced position an angular amount which is dependent upon the axial movement of the rollrings, guide means for constraining said output means for movement in a direction parallel to said axes of the shaft.

9. A variable speed drive mechanism comprising, a pair of spaced apart parallel shafts, at least one of said shafts having a conical peripheral surface, the adjacent facing surfaces of said shafts being disposed parallel to one another, a pair of rollrings encircling said shafts, means aligning said rollrings with one another in a manner such that the portions of the rollrings disposed in the space between the shafts are engaged at their inner peripheries with the adjacent portions of the surfaces of the shafts and are engaged at their outer peripheries with one another, whereby rotation of one shaft is effective to cause rotation of the other shaft through the rollrings interposed therebetween and the relative speeds of rotation of the two shafts are dependent upon the position of the rollrings along the longitudinal axes of said shafts, input means including a pair of flexure pieces for applying an input signal to tilt said rollings about an axis passing through the centers of the rollrings and areas of engagement of the rollrings and shafts from a balanced position wherein the rollrings rotate at fixed axial positions on the shafts to a position wherein rotation of the shafts frictionally drives the rollrings axially along the shafts to thereby change the relative speeds of rotation of the shafts, stop means for limiting the magnitude of said input signal, and means for summing up the axial movement of the rollrings and tilting the rollrings back toward the balanced position an angular amount which is dependent upon the axial movement of the rollrings, said means including a lever arm having one end portion associated with said flexure pieces and another end portion associated with the rollrings.

10. A servo-mechanism of the type wherein a variable magnitude input signal effects a corresponding variable displacement of a part of the mechanism and comprising, input means for applying a variable magnitude input signal in a first direction within a plane, follower means movable in and restricted to movement in a second direction within said plane, and a lever arm operatively associated at spaced-apart points on the arm with both the input means and the follower means for transmitting signals therebetween, said lever arm being angularly inclined with said first and second directions in a manner such that the longitudinal axis of the lever arm and lines extending along said first and second directions in said plane form a first triangle having a predetermined relationship between the interior angles thereof whenever the servo system is in an equilibrium condition, the spacing between said points being variable and the application of an input signal through said input means being effective to vary the angular inclination of the lever arm from said equilibrium condition, and means for moving the follower means, in said second direction and in response to said variation in the angular inclination of the lever arm, to a new position wherein the axis of the lever arm and said lines form a second triangle which is proportional to said first triangle and wherein the predetermined relationship between the interior angles is restored.

11. A servo-mechanism as defined in claim 10 wherein said last-named means include a rotatable shaft and a rollrings disposed in encircling relation therewith and biased into engagement with a portion of the periphery of the shaft, and wherein said rollring is tiltable from a balanced position wherein said rollring rotates at a fixed axial location on said shaft to a position wherein rotation of the shaft frictionally drives the rollring axially of the shaft in said second direction.

12. A servo-mechanism as defined in claim 10 wherein said last-named means include a pair of parallel shafts having complementary conical peripheral surfaces and a pair of rollrings disposed in encircling relation therewith in a manner such as to have portions intermediate the shafts engaged with both the shafts and one another so that rotation of either shaft effects rotation of the other shaft and the relative speeds of the shafts are dependent upon the axial position of said rollrings, and wherein said rollrings are tiltable from a balanced position wherein said rollrings rotated at fixed axial positions on said shafts to a position wherein rotation of the shafts frictionally drive the rollrings axially on the shafts in said second direction to effect a corresponding change in the relative speeds of the shafts.

13. A servo-mechanism of the type wherein a variable magnitude input signal effects a corresponding variable displacement of a part of the mechanism and comprising, input means movable along a first path for applying a variable magnitude input signal in a first direction within a plane, follower means movable along a second path in a second direction within said plane transverse to said first direction, and a lever arm pivotally connected to the input means and slidably connected to the follower means for transmitting an input signal from the input means to the follower means for causing movement of the follower means in said second direction, said lever arm having a predetermined angular inclination with said second path in an equilibrium condition of said servo system, the length of the lever arm intermediate the connections to the input and follower means being variable by reason of said slidable connection and the application of an input signal through said input means being effective to vary the angular inclination of the lever arm relative to said second path, and means including a ring biased into engagement with a rotatable shaft for moving the follower means in said second direction in response to variation in the angular inclination of the lever arm until said lever arm is restored to said predetermined angular inclination.

14. A servo-mechanism of the type wherein a variable magnitude input signal effects a corresponding variable displacement of a part of the mechanism and comprising, input means movable along a first path for applying a variable magnitude input signal in a first direction within a plane, follower means movable along a second path in a second direction within said plane transverse to said first direction, and a lever arm slidably associated with the input means and attached to the follower means for transmitting signals therebetween, said lever arm having a predetermined angular inclination with said second path in an equilibrium condition of said servo-mechanism, the application of an input signal through said input means being effective to vary the angular inclination of the lever arm relative to said second path, and means including a rollring encircling and biased into engagement with a rotatable shaft for moving the follower means in said second direction in response to variation in the angular inclination of the lever arm until said lever arm is restored to said predetermined angular inclination.

References Cited in the file of this patent

UNITED STATES PATENTS

| | | |
|---|---|---|
| 2,317,418 | Svobda | Apr. 27, 1943 |
| 2,412,386 | Borell | Dec. 10, 1946 |
| 2,432,442 | Pourtier | Dec. 9, 1947 |
| 2,583,790 | Mikina | Jan. 29, 1952 |

FOREIGN PATENTS

| | | |
|---|---|---|
| 147,713 | Switzerland | Sept. 1, 1931 |